United States Patent
Huu

(10) Patent No.: US 11,620,537 B2
(45) Date of Patent: Apr. 4, 2023

(54) OPTIMIZING GRADIENT BOOSTING FEATURE SELECTION

(71) Applicant: SAP SE, Walldorf (DE)

(72) Inventor: Jacques Doan Huu, Montigny le Bretonneux (FR)

(73) Assignee: SAP SE, Walldorf (DE)

( * ) Notice: Subject to any disclaimer, the term of this patent is extended or adjusted under 35 U.S.C. 154(b) by 360 days.

(21) Appl. No.: 16/858,143

(22) Filed: Apr. 24, 2020

(65) Prior Publication Data

US 2021/0334667 A1 Oct. 28, 2021

(51) Int. Cl.
*G06F 7/00* (2006.01)
*G06F 16/00* (2019.01)
*G06N 5/02* (2023.01)
*G06F 16/22* (2019.01)
*G06F 16/23* (2019.01)

(52) U.S. Cl.
CPC .......... *G06N 5/02* (2013.01); *G06F 16/2228* (2019.01); *G06F 16/2365* (2019.01)

(58) Field of Classification Search
None
See application file for complete search history.

(56) References Cited

U.S. PATENT DOCUMENTS

| 2016/0247019 A1* | 8/2016 | Chulinin | G06V 30/413 |
| 2019/0050750 A1* | 2/2019 | Le | G06N 3/0427 |

OTHER PUBLICATIONS

"European Application Serial No. 20213358.3, Extended European Search Report dated Jun. 24, 2021", 12 pgs.

Appel, Ron, et al., "Quickly Boosting Decision Trees—Pruning Underachieving Features Early", Proceedings of the 30th International Conference on Machine Learning, [Online]. Retrieved from the Internet: <URL: http://proceedings.mlr.press/v28/appel13.pdf>, (Aug. 21, 2013), 9 pgs.

Joly, Arnaud, "Exploiting random projections and sparsity with random forests and gradient boosting methods—Application to multi-label and multi-output learning, random forest model compression and leveraging input sparsity (PhD Thesis) Part 2", ARXIV: 1704.08067v1. Cornell University Library, (Apr. 26, 2017), 84 pgs.

(Continued)

*Primary Examiner* — Tuan A Pham
(74) *Attorney, Agent, or Firm* — Schwegman Lundberg & Woessner, P.A.

(57) ABSTRACT

Gradient Boosting Decision Tree (GBDT) successively stacks many decision trees which at each step try to fix the residual errors from the previous steps. The final score produced by the GBDT is the sum of the individual scores obtained by the decision trees for an input vector. Overfitting in GBDT can be reduced by removing the input values that have the least impact on the output from the training data. One way to determine which input variable has the lowest predictive value is to determine the input variable that is used for the first time in the latest decision tree in the GBDT. This method of identifying the low-predictive features to be removed does not require that earlier trees be regenerated to generate the new GBDT. Since the removed feature was already not used in the earlier trees, those trees already ignore the removed feature.

20 Claims, 12 Drawing Sheets

(56) References Cited

OTHER PUBLICATIONS

Joly, Arnaud, "Exploiting random projections and sparsity with random forests and gradient boosting methods—Application to multi-label and multi-output learning, random forest model compression and leveraging input sparsity (PhD Thesis) Part 3", ARXIV: 1704.08067v1. Cornell University Library, (Apr. 26, 2017), 48 pgs.

Joly, Arnaud, "Exploiting random projections and sparsity with random forests and gradient boosting methods—Application to multi-label and multi-output learning, random forest model compression and leveraging input sparsity (PhD Thesis) Part 1", ARXIV: 1704.08067v1. Cornell University Library, (Apr. 26, 2017), 84 pgs.

Mohammadi, Reza, et al., "Exploring the impact of foot-by-foot track geometry on the occurrence of rail defects", Transportation Research Part C: Emerging Technologies, vol. 102, (May 1, 2019), 153-172.

Ning, Yunkun, et al., "Detection Algorithm based on Gradient Boosting Decision Tree", IEEE International Conference on Signal Procesisng, Communications and Computing, (Sep. 20, 2019), 4 pgs.

Tian, Zhenya, et al., "Credit Risk Assessment based on Gradient Boosting Decision Tree", Procedia Computer Science 174, (2020), 150-160.

* cited by examiner

800

| 810 | METADATA TABLE | | | |
|---|---|---|---|---|
| 820 | GBDT | TREE | FEATURES | ERROR |
| 830A | 1 | 1 | F2, F3 | 0.28 |
| 830B | 1 | 2 | F1 | 0.14 |
| 830C | 1 | 3 | F4 | 0.11 |
| 830D | 1 | 4 |  | 0.08 |
| 830E | 1 | 5 | F6, F7 | 0.06 |
| 830F | 1 | 6 | F8 | 0.04 |

| 840 | PREDICTION TABLE | | | |
|---|---|---|---|---|
| 850 | INPUT VECTOR | GDBT | TREE | VALUE |
| 860A | V1 | 1 | 1 | .8070 |
| 860B | V1 | 1 | 2 | .9143 |
| 860C | V1 | 1 | 3 | .9457 |
| 860D | V1 | 1A | 3A | .9402 |
| 860E | V2 | 1 | 1 | 0.4000 |
| 860F | V2 | 1 | 2 | 0.216 |

*FIG. 8*

OPTIMIZING GRADIENT BOOSTING FEATURE SELECTION

TECHNICAL FIELD

The subject matter disclosed herein generally relates to feature selection for machine learning. Specifically, the present disclosure addresses systems and methods to improve gradient boosting feature selection.

BACKGROUND

A gradient boosting decision tree predicts a value of a target variable based on one or more inputs. Each node of a first tree splits the input space into two parts based on a value of a single input. During training, the first tree is limited to a maximum depth to prevent overfitting. Instead of increasing the depth to improve the accuracy of the first tree, a second tree is created that predicts the difference between the predicted value from the first tree and the actual value of the variable. This process is repeated until a termination condition is reached. The resulting ensemble of trees is used to predict the value of the target for unlabeled data not included in the training dataset.

BRIEF DESCRIPTION OF THE DRAWINGS

Some embodiments are illustrated by way of example and not limitation in the figures of the accompanying drawings.

FIG. 8 is a block diagram of a database schema, according to some example embodiments, suitable for use in gradient boosting feature selection.

DETAILED DESCRIPTION

Figure 1:
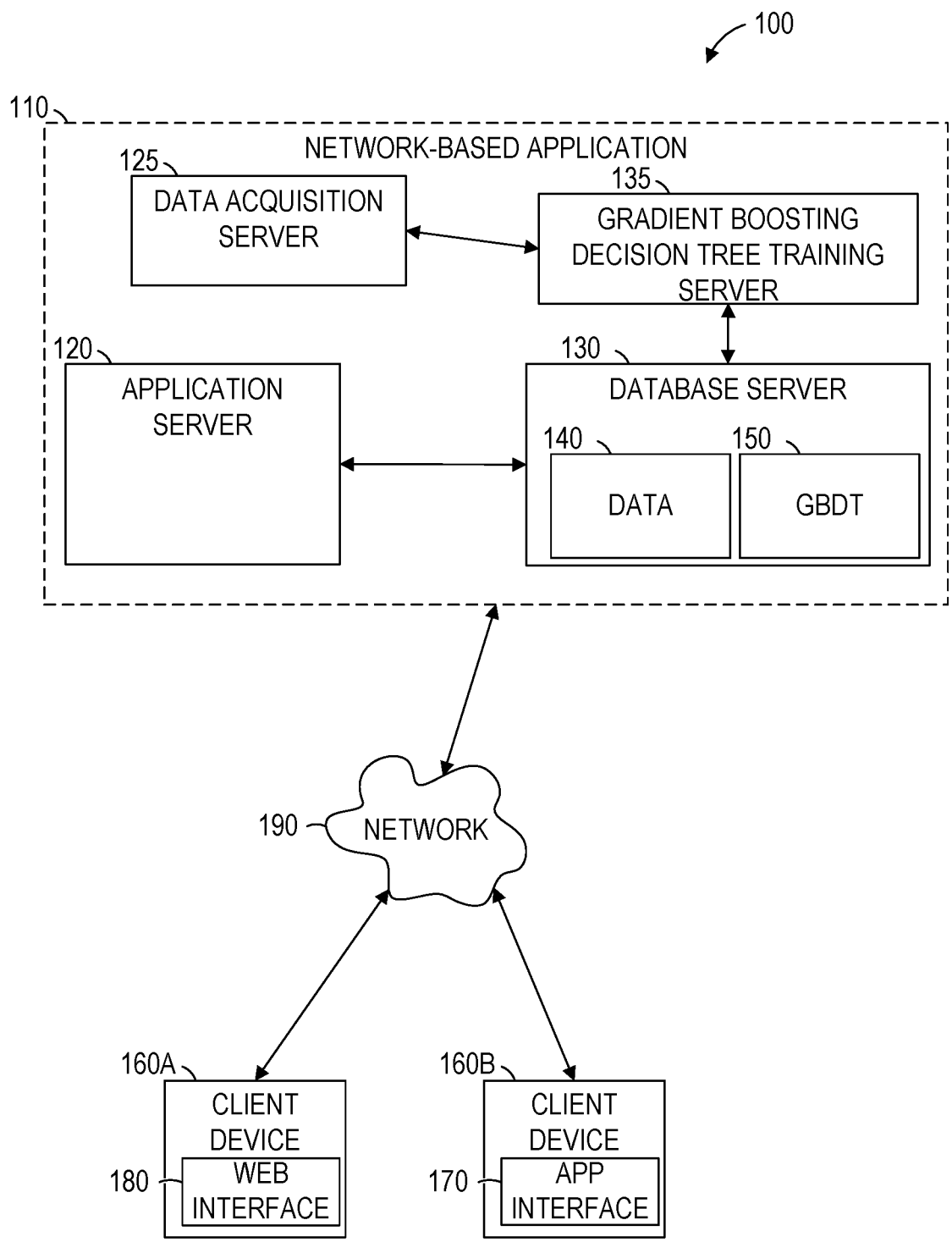
FIG. 1 is a network diagram illustrating a network environment suitable for gradient boosting feature selection, according to some example embodiments.

Example methods and systems are directed to gradient boosting feature selection. Gradient boosting decision tree (GBDT) is a very popular technique to address classification and regression tasks with excellent accuracy results. GBDT relies on an ensemble approach that combines many weak estimators. Thus, the classification or regression task is resolved by breaking the task down into smaller sub-problems which are then tackled iteratively.

GBDT successively stacks many decision trees which at each step try to fix the residual errors. Thus, as additional trees are added to the ensemble, the error is gradually reduced. Each decision tree partitions the feature space, guided by the optimization of an objective or loss function. During creation of any individual decision tree, the partitioning process stops once termination criteria are satisfied (e.g., a minimum number of partitions are added to the decision tree, a maximum tree depth is reached, a minimum residual error is reached, or any suitable combination thereof). Leaf nodes in the decision tree are assigned a score value for the classification or regression that minimizes the total error on training data within the corresponding feature space. The final score produced by the GBDT is merely the sum of the individual score values obtained by applying the decision trees on an input vector. In various embodiments, the number of decision trees ranges from fewer than ten to several thousand. GBDT error may be measured as the mean squared error or logarithmic loss on the training dataset or a separate validation dataset.

Overfitting is a problem with any regression algorithm, including GBDT. When an algorithm is overfitted to data, the measure of error for the training data becomes very small (or is even reduced to zero) but, seemingly paradoxically, the measure of error for previously unseen data increases. Overfitting results from the algorithm completely learning the training dataset itself rather than determining patterns that are generally applicable to unseen data. One way to reduce overfitting in GBDT is to remove from the training data the input values that have the least impact on the output in order to reduce the model complexity. For example, an algorithm for predicting home value may be initially trained using a large number of input variables, including zip code, square feet, number of bedrooms, and age of the current owner. Since the owner's age has a low correlation with the value of the home, the age essentially acts as an identifier for a particular entry, allowing the model to overfit but not providing useful predictive power. After determining that the owner's age has a low impact on the target prediction, that field is removed from the training data and the GBDT is rebuilt. The error of the rebuilt GBDT is compared to the error of the original GBDT and, if the change is small, the original GBDT is discarded and the new GBDT is used instead. The process may be repeated until further removal of input variables has a substantial impact on the error of the resulting model.

One way to determine which input variable has low predictive value is to determine the input variable that is used for the first time in the latest decision tree in the GBDT. Since each successive decision tree attempts to reduce the error of the aggregated previous trees, the impact on the error of the GBDT of the last tree is smaller than the impact of any previous tree. Thus, the input variables that are not used in the earlier trees have lower predictive values than the input variables that are used earlier. Accordingly, by storing, in a database, data that indicates which features are first used in each decision tree as the decision trees are created, the explicit computation of the predictive value of each feature can be eliminated.

When using this method of identifying which low-predictive features to remove, the earlier trees do not need to be regenerated to generate the new GBDT. Since the removed feature was not used in the earlier trees, those trees already ignore the removed feature. Thus, only the tree in which the removed feature first appeared (and subsequent trees) needs to be regenerated, saving computation time over methods that rebuild the GBDT from the first tree using the reduced feature set. Furthermore, since a first set of trees of the GBDT are reused, the score values of that portion of the GBDT may be reused without recalculation in order to compute the error of the next model augmented with a new tree: this incremental error computation leverages the additive nature of the score values produced by each decision tree.

When these effects are considered in aggregate, one or more of the methodologies described herein may obviate a need for certain efforts or resources that otherwise would be involved in training or using a GBDT. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating a network environment 100 suitable for gradient boosting feature selection, according to some example embodiments. The network environment 100 includes a network-based application 110, client devices 160A and 160B, and a network 190. The network-based application 110 is provided by an application server 120 in communication with a database server 130, storing data 140 and a GBDT 150.

The application server 120 accesses the data 140 to provide an application to the client devices 160A and 160B via a web interface 180 or an application interface 170. The application server 120, a data acquisition server 125, the database server 130, the GBDT training server 135, and the client devices 160A and 160B may each be implemented in a computer system, in whole or in part, as described below with respect to FIG. 12. The client devices 160A and 160B may be referred to collectively as client devices 160 or generically as a client device 160.

The data acquisition server 125 receives data from one or more data sources. The received data is provided to the GBDT training server 135 for training one or more GBDTs. The trained GBDTs are transferred to the database server 130 and stored as the GBDT 150. The application server 120 causes the GBDT to process the data 140 to generate a predicted value. The predicted value is provided by the application server 120 to a client device 160 via the network 190 for display to a user. Additionally or alternatively, the predicted value is used by the application server 120 to automatically control further operations of the application server 120. For example, a credit line to a business may be automatically extended or denied based on the predicted value.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the data acquisition server 125, the database server 130, the GBDT training server 135, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
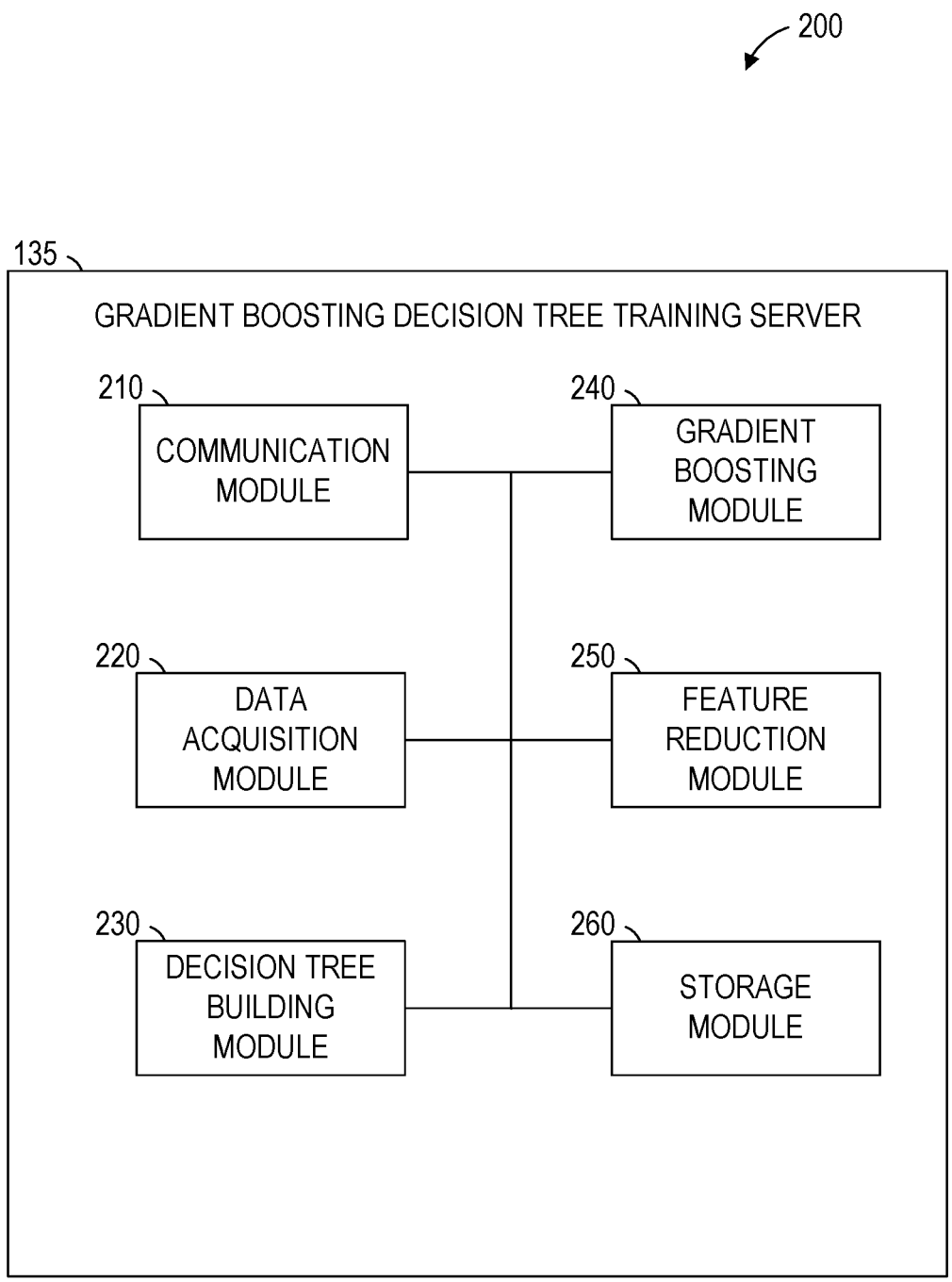
FIG. 2 is a block diagram of a gradient boosting decision tree training server, according to some example embodiments, suitable for training a gradient boosting decision tree using gradient boosting feature selection.

FIG. 2 is a block diagram 200 of a gradient boosting decision tree training server, according to some example embodiments, suitable for training a gradient boosting decision tree using a gradient boosting feature selection. The GBDT training server 135 is shown as including a communication module 210, a data acquisition module 220, a decision tree building module 230, a gradient boosting module 240, a feature reduction module 250, and a storage module 260, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the GBDT training server 135 and transmits data from the GBDT training server 135. For example, the communication module 210 receives, from the data acquisition server 125, domain data for one or more domains (e.g., data for a business unit, customer segment data, customer license data, customer meeting data, or any suitable combination thereof) and provides the domain data to the data acquisition module 220.

The data acquisition module 220 receives the domain data from the data acquisition server 125 or from multiple such data acquisition servers. The received domain data is processed by the data acquisition module 220 into a format suitable for training GBDTs.

The decision tree building module 230 builds individual decision trees using domain data from a domain. The gradient boosting module 240 causes the decision tree building module 230 to iteratively build decision trees to reduce the residual error of a training dataset or a validation dataset. Thus, the set of decision trees built by the decision tree building module 230 form a GBDT. The training dataset and the validation dataset are both sets of data for which the input features and the output value are known (also referred to as "labelled data"). A single set of labelled data may be divided into a training dataset and a validation dataset. For example, 20% of the set may be selected at random for use as the validation dataset and the remaining 80% used as the training dataset.

The feature reduction module 250 identifies features with low predictive value, removes them from the data set, and causes the decision tree building module 230 and the gradient boosting module 240 to form a second GBDT. The feature reduction module 250 controls the iterative process of forming simpler GBDTs until further simplification results in an increase in error beyond a predetermined threshold and rolls back the last change. The gradient boosting module 240 provides, via the communication module 210, a trained GBDT. Additionally or alternatively, the trained GBDT may be stored in a database or file system by the storage module 260.

Figure 3:
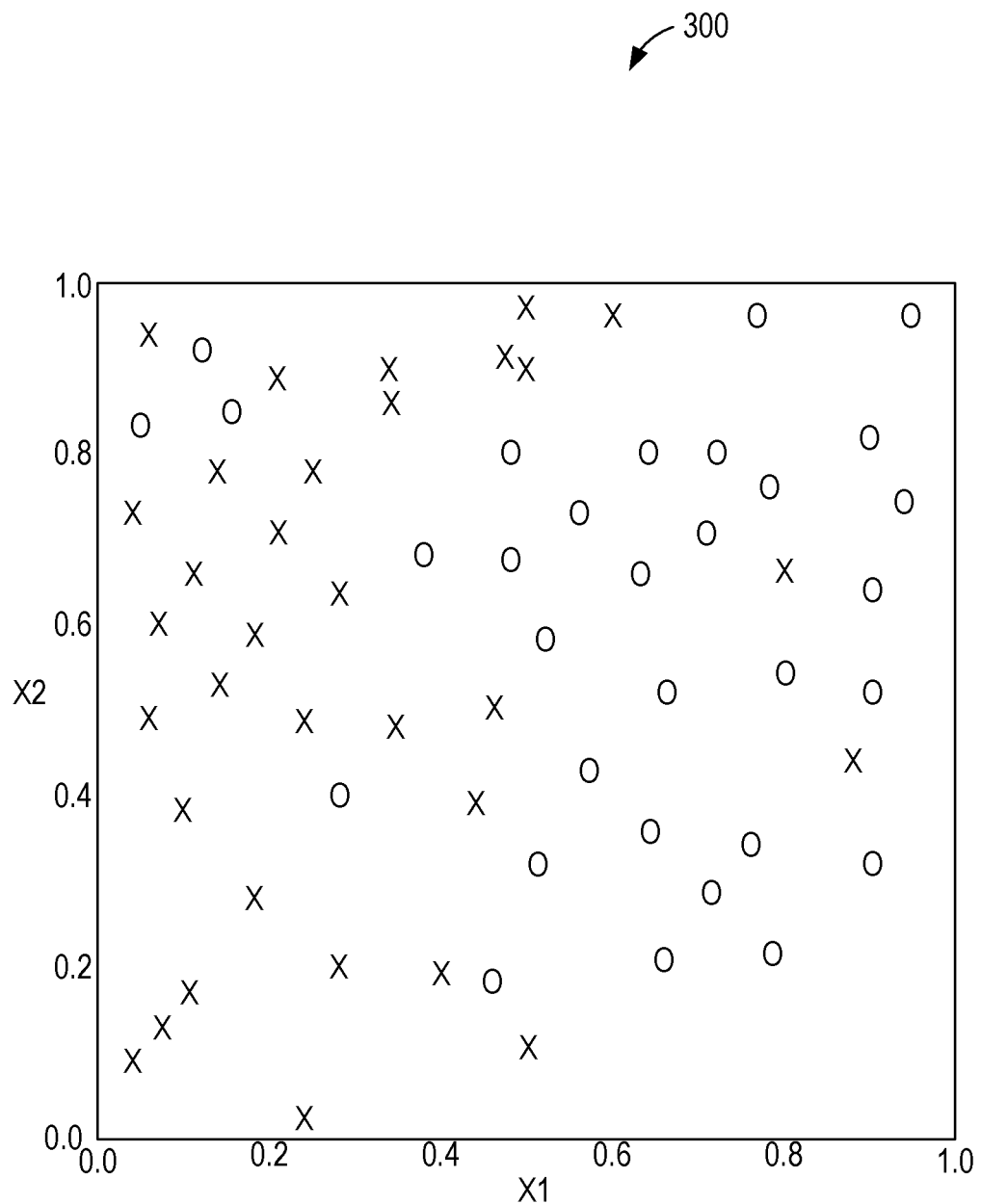
FIG. 3 is a diagram showing the distribution of discrete target values with a two-dimensional input variable space.

FIG. 3 is a diagram 300 showing example target values in a two-dimensional input variable space. The two dimensions of the space are labeled as X1 and X2, each of which has a range of 0 to 1. The values within the two-dimensional space are marked as X's and O's. For this discussion, an X has a value of 1 and an O has a value of 0. Thus, a GBDT may be created by the GBDT training server 135 to partition the two-dimensional space and generate a score value for each partition to minimize the error.

At the other extreme, the two-dimensional space may be divided such that each training value is in a separate partition, allowing the score value of each partition to be set exactly to the training empirical value and reducing the error to zero. However, the predictive value of the resulting GBDT will be lower than that of another, non-overfitted GBDT. Accordingly, the GBDT training server 135 strives to find a GBDT that reduces the error without overfitting.

Figure 4:
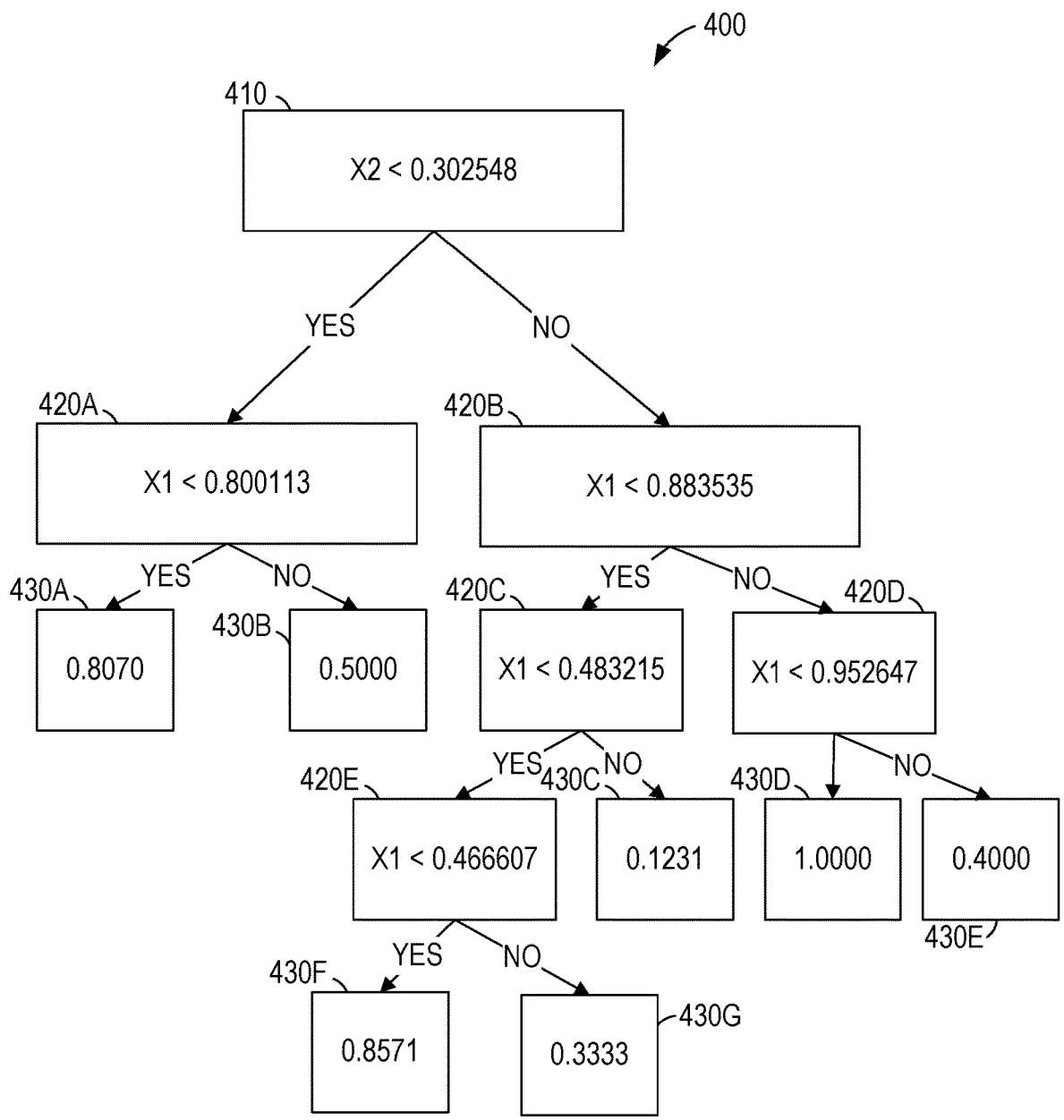
FIG. 4 is a diagram showing a decision tree for predicting the target value from the two-dimensional input variable space of FIG. 3.

FIG. 4 is a diagram showing a decision tree 400 for predicting the variable value of the two-dimensional space of FIG. 3. The decision tree 400 includes the root node 410; intermediate nodes 420A, 420B, 420C, 420D, and 420E; and leaf nodes 430A, 430B, 430C, 430D, 430E, 430F, and 430G.

To predict a value for a point in the two-dimensional space of FIG. 3, a series of comparisons are made, beginning with the comparison of the root node 410. Thus, if the X2 value of the point is less than 0.302548, the next comparison is the comparison of the intermediate node 420A. Otherwise, the next comparison is the comparison of the intermediate node 420B. After a number of comparisons are made, one of the leaf nodes 430A-430G is reached. Each of the leaf nodes 430A-430G indicates the score value for points that fall within the region for the leaf node defined by the decision tree 400. For example, the leaf node 430A is reached for all points having X2<0.0302548 and X1<0.800113.

Figure 5:
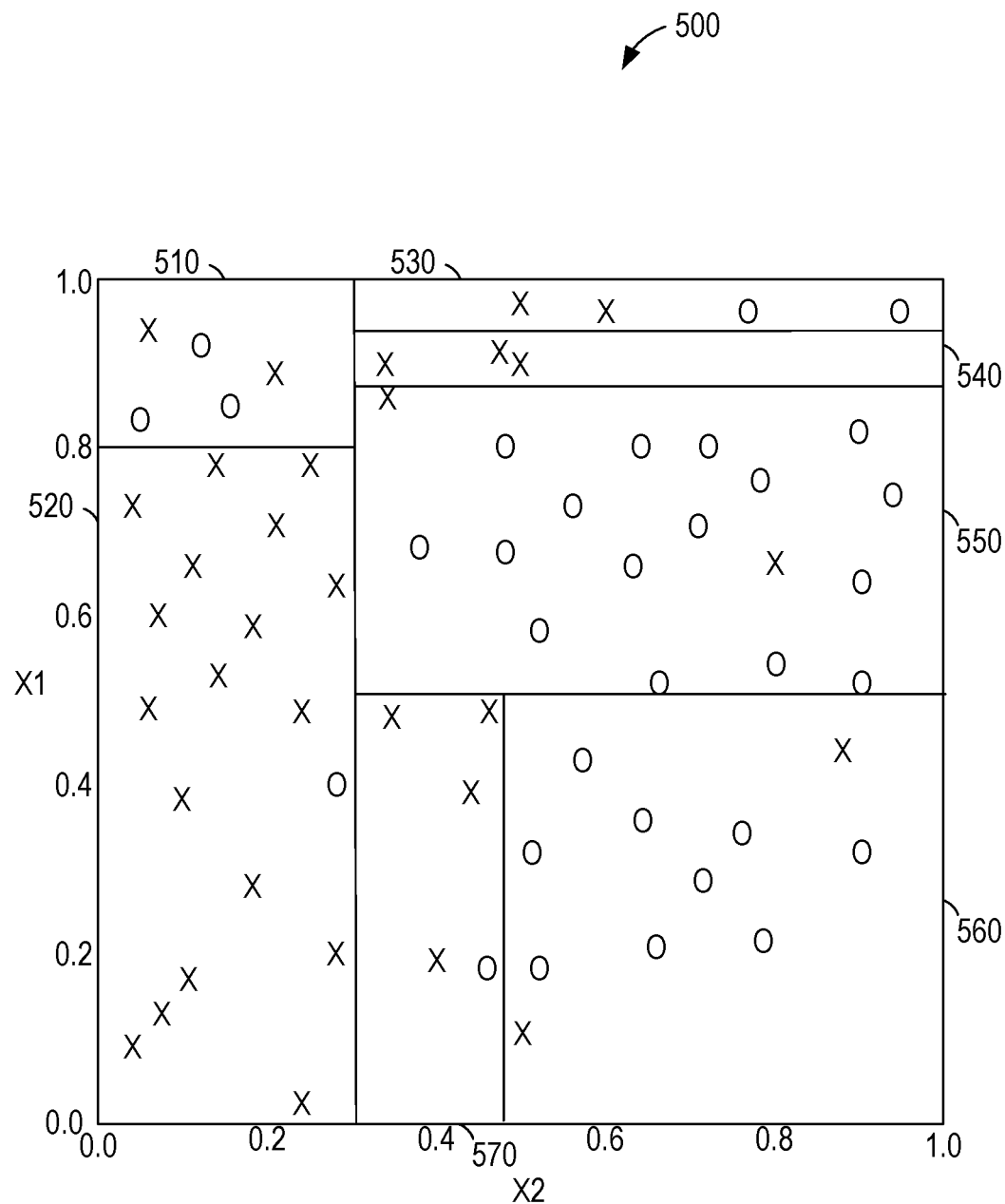
FIG. 5 is a diagram showing the two-dimensional space of FIG. 3 divided using the decision tree of FIG. 4.

FIG. 5 is a diagram 500 showing the two-dimensional space of FIG. 3 divided using the decision tree 400 of FIG. 4. The two-dimensional space of FIG. 3 is divided into regions 510, 520, 530, 540, 550, 560, and 570.

Each of the regions 510-570 corresponds to one of the leaf nodes 430A-430G of the decision tree 400. For example, the region 510 includes all points having X2<0.302548 and X1>=0.952647. This region corresponds to the leaf node 430E and is reached by evaluating the root node 410 and the leaf nodes 420B and 420D. The predicted value of the leaf node 430E is 0.4. As another example, the region 550 includes all points having X2>=0.302548 and 0.483215<=X1<0.883535. This region corresponds to the leaf node 430C, which is reached by evaluating the root node 410 and the leaf nodes 420B and 420C. The score value of the leaf node 430C is 0.1231.

Figure 6:
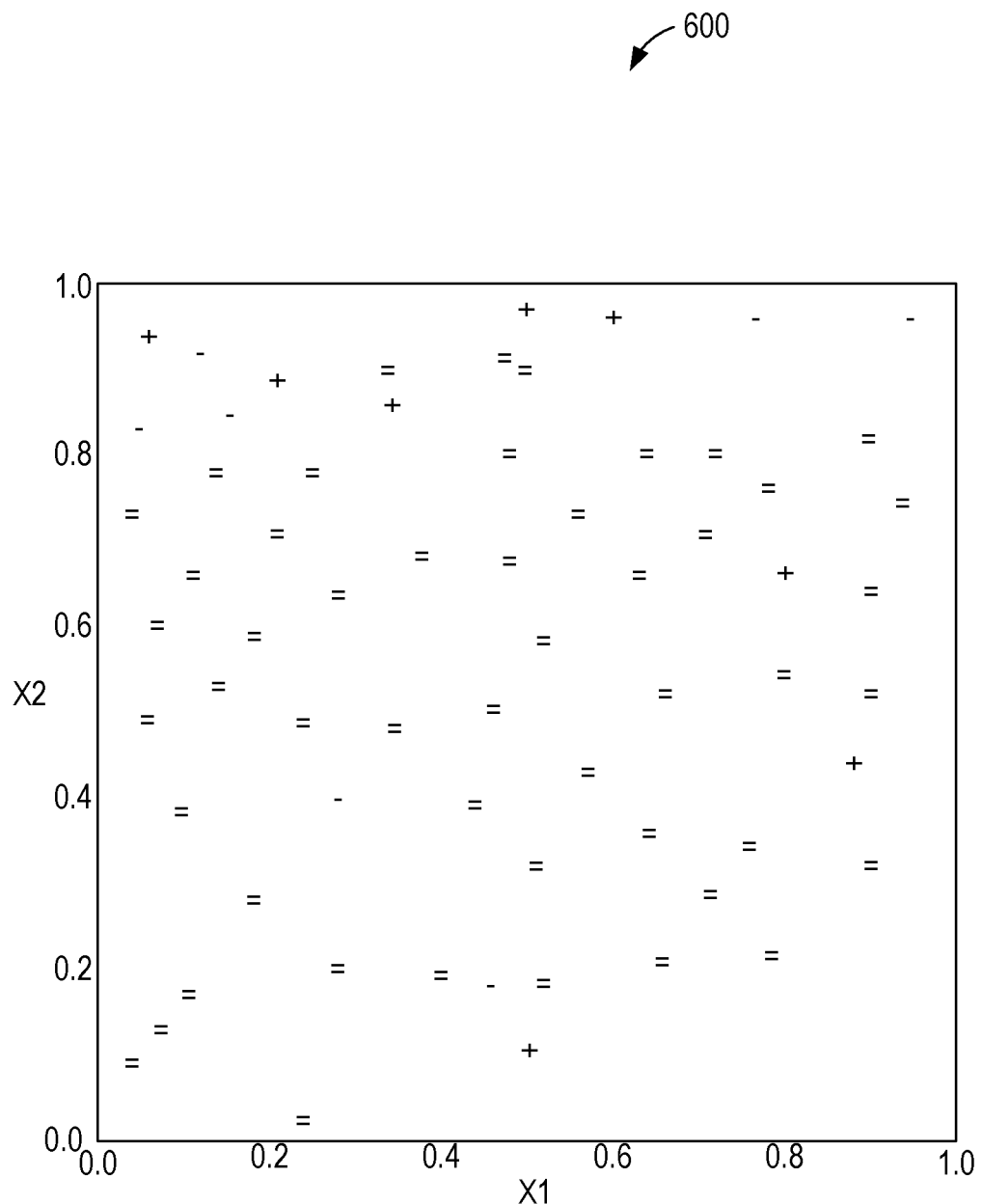
FIG. 6 is a diagram showing the residual error distribution in the two-dimensional input variable space of FIG. 3 after applying the decision tree of FIG. 4.

FIG. 6 is a diagram 600 showing a distribution of error measure between the predicted values generated using the decision tree 400 and the actual values in the two-dimensional space of FIG. 3. In practice, numerical values are often used, but in the diagram 600, the symbol "=" is used when the predicted value is within 0.25 of the actual value, the symbol "+" is used when the actual value is at least 0.25 more than the predicted value, and the symbol "−" is used when the actual value is at least 0.25 less than the predicted value. Thus, when a second decision tree is generated, it will tend to repartition high-error subspace illustrated with '+' symbol in FIG. 6 to correct the error measures generated by the first decision tree 400. As a result, summing the results of the two decision trees will result in a lower average error than using the first decision tree 400 alone. By repeating this process, an arbitrary number of decision trees may be generated and summed, reducing the error with each iteration.

Figure 7:
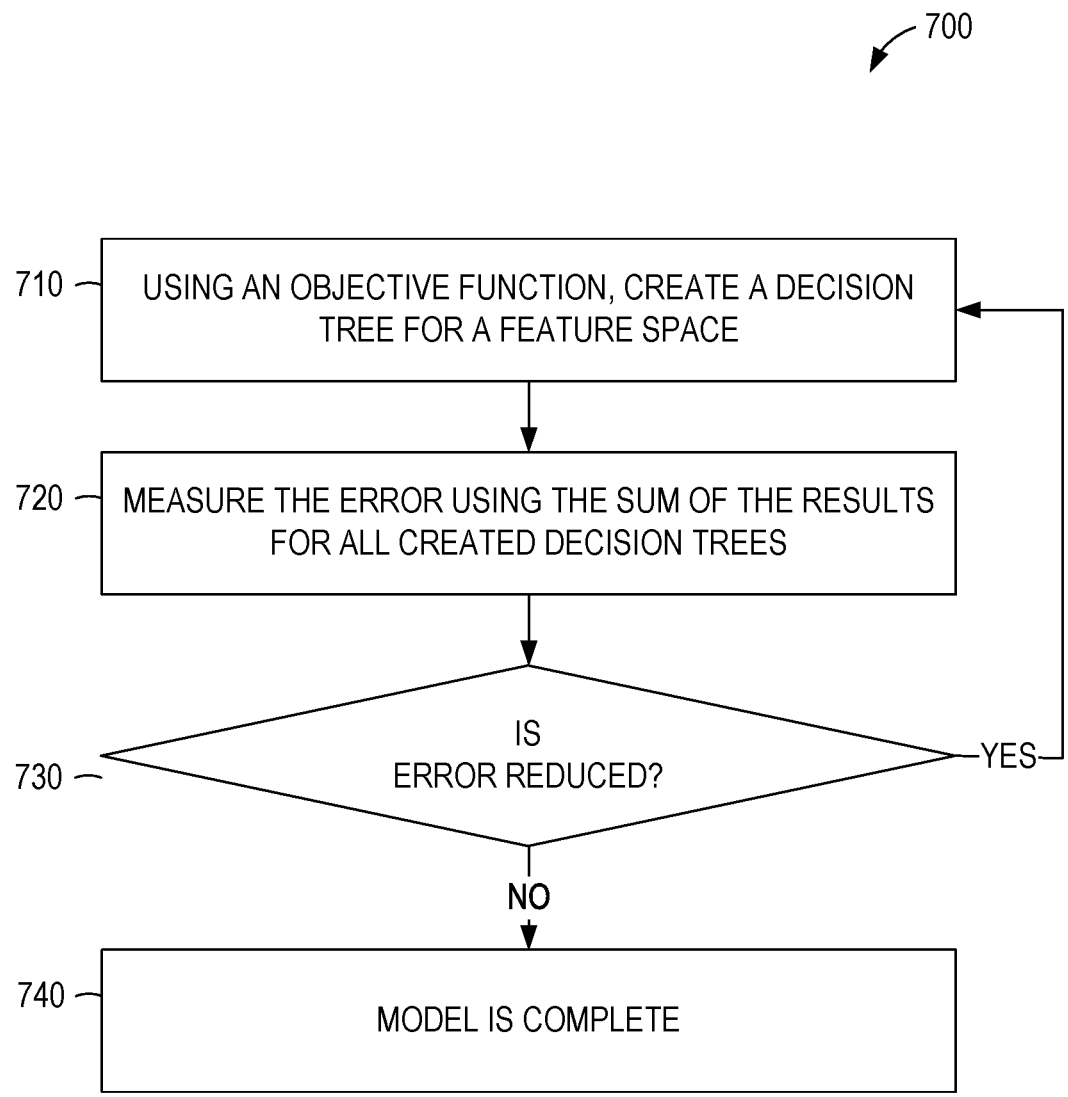
FIG. 7 is a flowchart illustrating operations of a method suitable for training a gradient boosting decision tree, according to some example embodiments.

FIG. 7 is a flowchart illustrating operations of a method suitable for training a gradient boosting decision tree, according to some example embodiments. The method 700 includes operations 710, 720, 730, and 740. By way of example and not limitation, the method 700 is described as being performed in the network environment 100 of FIG. 1 by the gradient boosting decision tree training server 135 described in FIG. 2.

In operation 710, the decision tree building module 230, using an objective function, creates a decision tree (e.g., the decision tree 400) for a feature space. During creation of the decision tree, the partitioning process stops once termination criteria are satisfied (e.g., a minimum number of partitions are added to the decision tree, a maximum tree depth is reached, a minimum residual error is reached, or any suitable combination thereof). For example, the partitioning process may stop when the depth reaches a predetermined maximum of 4-8. Leaf nodes in the decision tree are assigned a value for the classification or prediction that minimizes the total error for training data within the corresponding feature space.

The gradient boosting module 240, in operation 720, measures the error using the sum of the results for all created decision trees. Thus, in the first boosting iteration, the error for the first decision tree is determined (e.g., as depicted in FIG. 6). In subsequent iterations, results from multiple decision trees are added together and compared with the actual value for each feature vector in the feature space to determine the error.

In operation 730, the gradient boosting module 240 determines whether the error is below a predetermined threshold. If the error is below the predetermined threshold, the model is complete (operation 740). In some example embodiments, operation 730 is modified to determine that the model is complete if the error is not reduced anymore or a predetermined maximum number of trees has been generated (e.g., 1000 trees).

If the model is not complete, the method returns to operation 710 and another decision tree is created for the feature space. Since each iteration reduces the error, an arbitrarily low value for the predetermined threshold may be used, but a lower value will result in a higher number of decision trees being used. Additionally, overfitting is possible, such that setting too low of a value for error on the training dataset actually results in a higher error value for the validation dataset or future data.

FIG. 8 is a block diagram of a database schema 800, according to some example embodiments, suitable for use in gradient boosting feature selection. The database schema 800 includes a metadata table 810 and a prediction table 840. The metadata table 810 includes rows 830A, 830B, 830C, 830D, 830E, and 830F of a format 820. The prediction table 840 includes rows 860A, 860B, 860C, 860D, 860E, and 860F of a format 850. The gradient boosting decision tree training server 135 generates data for the metadata table 810 and the prediction table 840 during performance of the method 700.

The format 820 of the metadata table 810 includes a GBDT field, tree field, a features field, and an error field. Each of the rows 830A-830F stores data for a single decision tree in a gradient boosting decision tree. The tree field for each row indicates which tree the row applies to within the GBDT, and the GBDT field identifies which GBDT the row applies to. In the example of FIG. 8, data for a single GBDT is shown, but the metadata table 810 is suitable for storing data of multiple GBDTs making different predictions in different feature spaces, for multiple alternative GBDTs making predictions in a single feature space, or any suitable combination thereof.

Each non-leaf node of a decision tree divides the feature space on a single feature. Thus, each decision tree makes use of one or more features, but does not necessarily make use of all features. The features used in a decision tree that are not used in earlier decision trees are indicated in the features field. Thus, in the example of FIG. 8, the feature space is at least eight-dimensional. The first decision tree uses only the features F2 and F3. The second decision tree uses the feature F1 for the first time and may or may not make use of the features F2 and F3. The third decision tree uses the feature F4 for the first time and may or may not make use of the features F1, F2, and F3. The fourth decision tree necessarily uses at least one feature, but the features field is empty because the fourth decision tree only uses features already used by one or more of the first three decision trees. The fifth decision tree introduces the use of features F6 and F7, and the sixth decision tree introduces the use of feature F8.

The error field indicates the cumulative error for the gradient boosting decision tree when making use of all trees up to the tree for the row, but not later trees. Thus, after a single tree was created, the error was 0.28, as indicated by the row 830A. Adding a second tree reduced the error to 0.14, as indicated by the row 830B. Each subsequent tree further reduced the error, until an error of 0.04 was reached by using six decision trees, as shown by the row 830F.

The format 850 of the prediction table 840 includes a GBDT field, a tree field, an input vector field, and a value field. The row 860A shows that the predicted (score) value for the input vector V1 generated by the first tree of the first GBDT is 0.8070. The row 860B shows that when the first prediction is refined by the second tree of the first GBDT, the refined prediction is 0.9143. The row 860C shows that when the two-tree prediction is refined by the third tree, the prediction becomes 0.9457. The row 860D shows that for an alternative GBDT 1A, using the same first two trees as the GBDT 1 but an alternative tree 3A, the refined prediction is 0.9402. The rows 860E and 860F contain data for another input vector, V2.

With reference to FIGS. 3-5, the vector V1 may correspond to an "X" point having a value of 1. Thus, each additional tree to the GBDT 1 brings the prediction value closer to 1, thereby reducing the error. However, the alternative tree 3A of the GBDT 1A reduces the error over the second tree by a lesser amount than the tree 3 of the GBDT 1. This results from removing a feature from the feature set that the tree 3 relied upon, though the amount of the increase error will vary by the importance of the removed feature.

Figure 9:
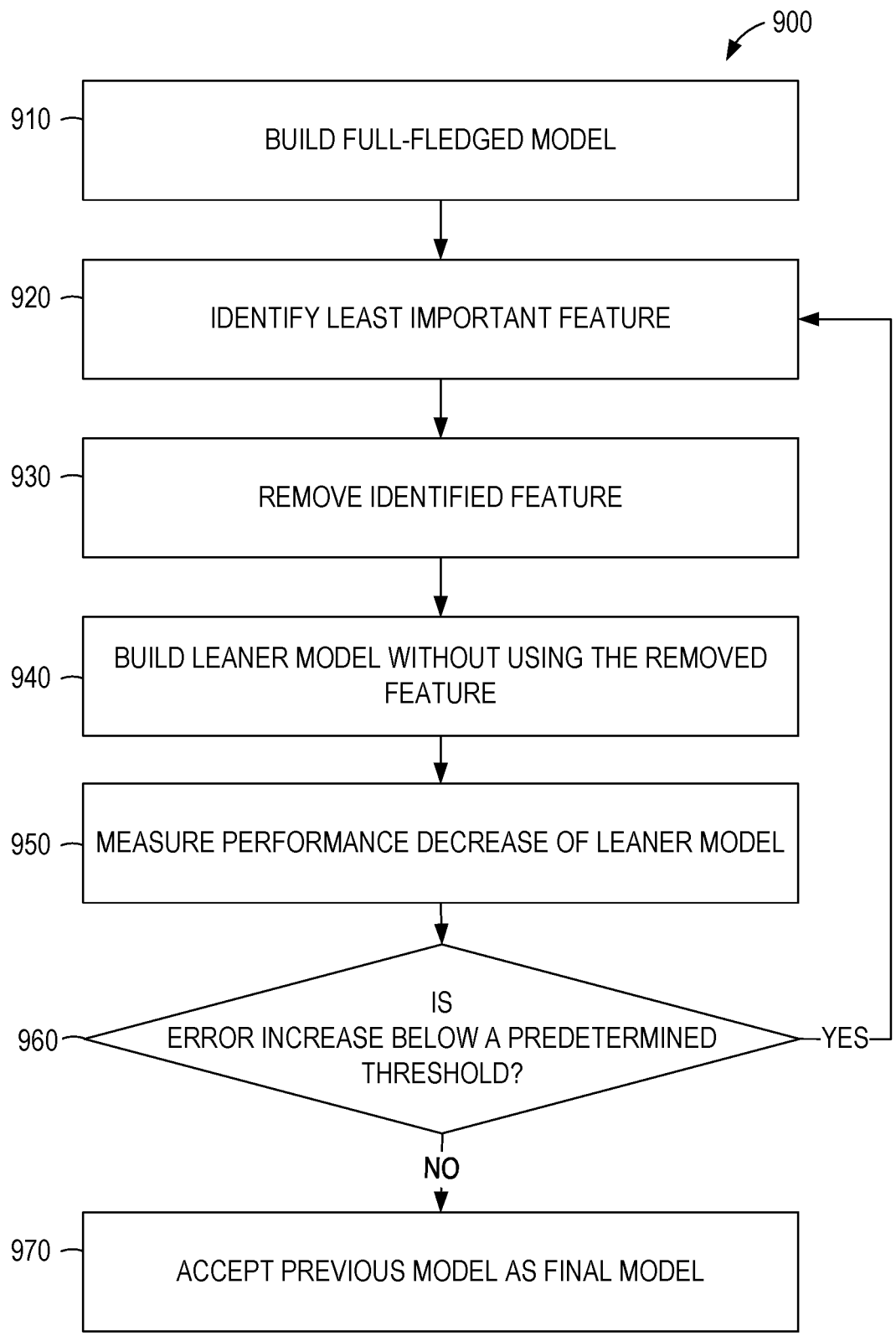
FIG. 9 is a flowchart illustrating operations of a method suitable for using a gradient boosting feature selection in training a gradient boosting decision tree, according to some example embodiments.

FIG. 9 is a flowchart illustrating operations of a method 900 suitable for using gradient boosting feature selection in training a gradient boosting decision tree, according to some example embodiments. The method 900 includes operations 910, 920, 930, 940, 950, 960, and 970. By way of example and not limitation, the method 900 is described as being performed in the network environment 100 of FIG. 1 by the gradient boosting decision tree training server 135 described in FIG. 2 using the database schema 800 of FIG. 8.

In operation 910, the gradient boosting decision tree training server 135 builds a full-fledged gradient boosting decision tree with all available features (e.g., using the method 700). The feature reduction module 250, in operation 920, identifies the least important feature: such importance is estimated by the gradient boosting module 240.

The identified feature is removed by the feature reduction module 250 from the set of available features for training (operation 930). In operation 940, the gradient boosting decision tree training server 135 builds a gradient boosting decision tree (e.g., using the method 700) without the removed feature. This model is referred to as a "leaner model" because it makes use of fewer features than the previous model. In some example embodiments, the process of building the leaner model skips steps by making use of the metadata table 810. For example, instead of beginning with recreating the first decision tree, only the decision trees using the removed feature are ignored and the process of building trees resumes by replacing the first decision tree using the removed feature with a new decision tree generated without using the removed feature. Thus, instead of starting with operation 710 creating a first decision tree, operation 710 recreates the sixth decision tree. Compared with methods that simply remove the feature and restart the creation of the gradient boosting decision tree from the beginning, this approach saves substantial computational and memory resources, as well as time.

In operation 950, the feature reduction module 250 measures the performance decrease of the leaner model. Since the GBDT training server 135 selected the removed feature in the previous model, removing that option forces the GBDT training server 135 to make a less-optimal choice, which will reduce the performance of the leaner module in comparison. The error measure of the model may be made against the training dataset or a validation dataset.

The prediction for an input vector is determined by summing the results, for the input vector, from all trees in the GBDT. The prediction table 840 may be used to save computation time in measuring the performance of the leaner model. For example, the partial prediction of the previous GBDT, taken up to the last tree that remains in the leaner GBDT, may be used in place of recalculating the prediction for that portion of the leaner GBDT. Thus, in the case of the GBDT 1A of the row 860D, the value field of the row 860B could be reused, avoiding reevaluation of the trees 1 and 2 to determine the value for input vector V1 using the GBDT 1A. Thus, only the partial prediction of the tree 3A is determined by evaluating a decision tree (e.g., 0.0279, such that the sum of the 0.9143 prediction in the row 860B and the prediction of the tree 3A for the vector V1 is the 0.9402 value of the row 860D). By comparison with other methods that reevaluate all preceding decision trees to determine the predicted value of leaner models, this method saves power, processing resources, and computation time.

If the error increase is below a predetermined threshold (operation 960), the trade-off between the feature reduction which complies with parsimony principle and the reduction in performance is accepted and the method 900 repeats the feature reduction process by returning to operation 920. Alternatively, if the error increase is not below the predetermined threshold in operation 960, the feature reduction is rejected by the feature reduction module 250 and the previous model is, in operation 970, accepted as the final model. Thus, by use of the method 900, features are removed from the model until doing so unacceptably reduces the quality of the model and the simplest model that is acceptably accurate is used.

Figure 10:
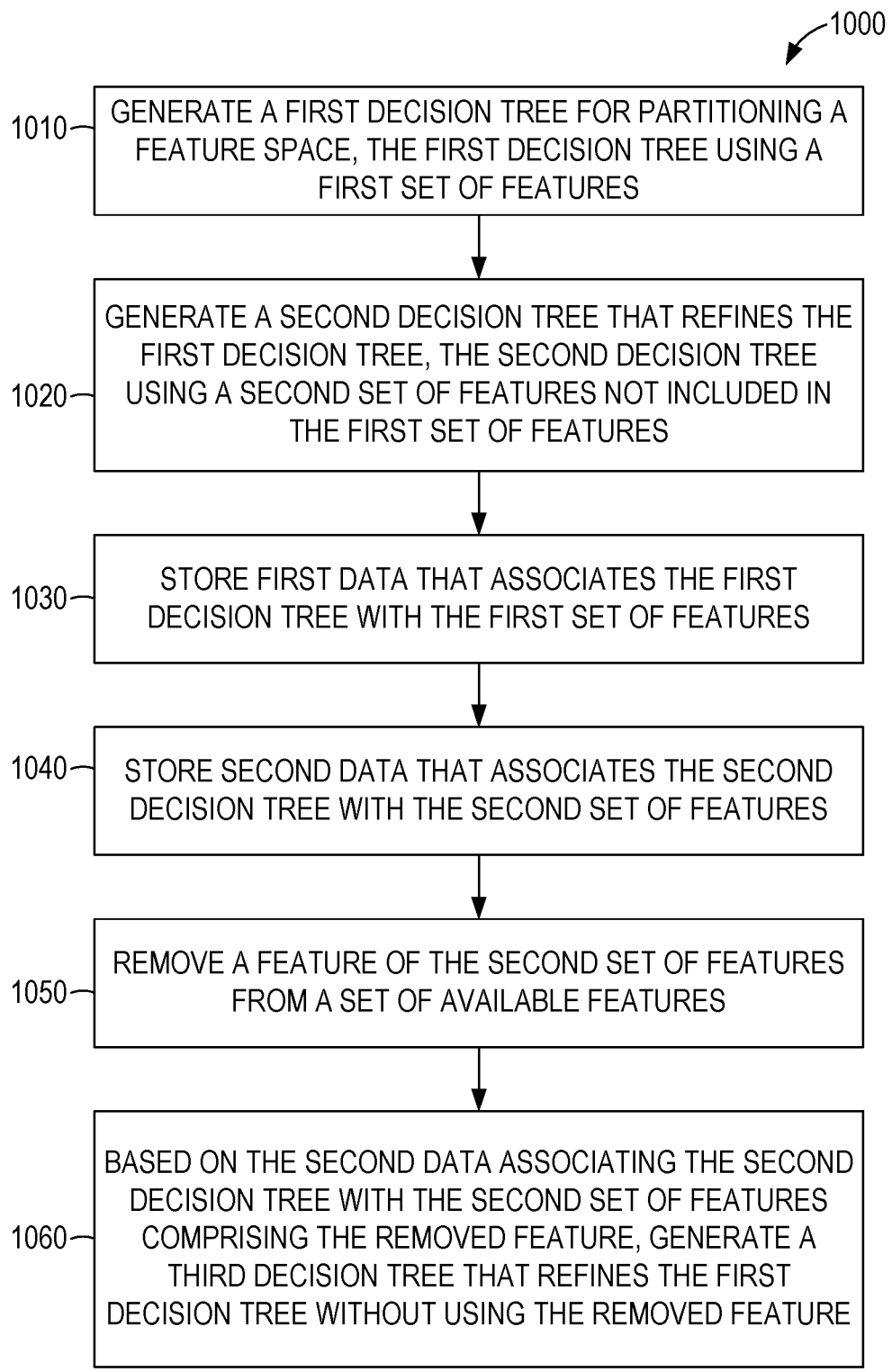
FIG. 10 is a flowchart illustrating operations of a method suitable for using a gradient boosting feature selection in training a gradient boosting decision tree, according to some example embodiments.

FIG. 10 is a flowchart illustrating operations of a method 1000 suitable for using gradient boosting feature selection in training a gradient boosting decision tree, according to some example embodiments. The method 1000 includes operations 1010, 1020, 1030, 1040, 1050, and 1060. By way of example and not limitation, the method 1000 is described as being performed in the network environment 100 of FIG. 1 by the gradient boosting decision tree training server 135 described in FIG. 2 using the database schema 800 of FIG. 8.

In operation 1010, the decision tree building module 230 generates a first decision tree for partitioning a feature space, the first decision using a first set of features. For example, the decision tree of the row 830A may be generated, using the features F2 and F3.

The decision tree building module 230, in operation 1020, generates a second decision tree that refines the first decision tree, the second decision tree using a second set of features not included in the first set of features. As an example, the decision tree of the row 830B uses the feature F1, which is not included in the set of features of the decision tree of the row 830A. The second decision tree may also use one or more features used in the first decision tree.

In operation 1030, the storage module 260 stores first data that associates the first decision tree with the first set of features. For example, the row 830A may be created or modified to associate the features F2 and F3 with the first decision tree.

The storage module 260 also, in operation 1040, stores second data that associates the second decision tree with the second set of features. Continuing with this example, the row 830B is created or modified to associate the feature F1 with the second decision tree.

In operation 1050, the feature reduction module 250 removes a feature of the second set of features from a set of available features. For example, operations 920 and 930 may be performed. In this example, the feature F1 may be removed from the set of features F1-F8 on which the decision trees referenced in the metadata table 810 are based.

The decision tree building module 230, in operation 1060, based on the second data associating the second decision tree with the second set of features comprising the removed feature, generates a third decision tree that refines the first decision tree without using the removed feature.

The discussion of the method 1000 above refers to the decision trees of the rows 830A and 830B as the first decision tree and the second decision tree, but the method 1000 may also be used with other pairs of decision trees. For example, with reference to the rows 830E and 830F, decision tree "5" may be the first decision tree and decision tree "6" may be the second decision tree, wherein the first set of features used by the fifth decision tree is the aggregated set of features used by the first-fifth trees (F1, F2, F3, F4, F6, and F7) and the second set of features used by the sixth decision tree is F8.

As another example, consider a GBDT comprising the four decision trees corresponding to the rows 830A-830D. In this example, four decision trees are created, but the fourth does not introduce any new features. Operation 1010 refers to the decision tree of the row 830B; operation 1020 refers to the decision tree of the row 830C; and operations 1030 and 1040 refer to the storing of the rows 830B and 830C. Since the decision tree of the row 830D refines the decision tree of the row 830C, both decision trees are removed from the GBDT when creating an alternative GBDT that does not rely on the feature F4. Accordingly, the "third decision tree" of operation 1060, in this example, refers to the alternative decision tree that replaces the decision tree of the row 830C.

By using the metadata table 810 in operations 1030, 1040, and 1060, the method 1000 is enabled to build an alternate GBDT that avoids using a feature to model data without incurring substantial computational expense in identifying a least important feature. Additionally, by generating the alternative third decision tree to refine the first decision tree without regenerating the first decision tree, additional computation and memory resources are saved.

EXAMPLES

Example 1. A method comprising:
generating, by one or more processors, a first decision tree for partitioning a feature space, the first decision tree using a first set of features, the first set of features being a first subset of an available set of features;
generating, by the one or more processors, a second decision tree that refines the first decision tree to improve the partitioning of the feature space, the second decision tree using zero or more features of the first set of features and a second set of features not included in the first set of features, the second set of features being a second subset of the available set of features;
storing, in a database, first data that associates the first decision tree with the first set of features;
storing, in the database, second data that associates the second decision tree with the second set of features;
removing a feature of the second set of features from the available set of features; and
based on the second data associating the second decision tree with the second set of features comprising the removed feature, generating a third decision tree that refines the first decision tree to improve the partitioning of the feature space, the third decision tree not using the removed feature.

Example 2. The method of example 1, further comprising:
generating, by the one or more processors, a fourth decision tree that refines the first decision tree and the second decision tree to improve the partitioning of the feature space, the fourth decision tree using zero or more features of the first set of features, zero or more features of the second set of features, and a third set of features not included in the first set of features or the second set of features, the third set of features being a third subset of the available set of features;
storing, in the database, third data that associates the fourth decision tree with the third set of features; and
based on the third data associating the fourth decision tree with the third set of features not comprising the removed feature, determining, using the second data, that the removed feature is in the second set of features.

Example 3. The method of example 1 or example 2, further comprising:
determining a quality difference between a first model comprising the first decision tree and the second decision tree and a second model comprising the first decision tree and the third decision tree; and based on the quality difference and a predetermined threshold, using the first model to partition the feature space.

Example 4. The method of example 3, further comprising:
determining a first quality for the first model based on a validation dataset;
determining a second quality for the second model based on the validation dataset; and wherein
the determining of the quality difference is based on the first quality and the second quality.

Example 5. The method of example 3 or example 4, wherein the determining of the quality difference between the first model and the second model comprises:
determining a quality of the first model by determining a first error measure for the first decision tree and a second error measure for the second decision tree;
storing, in the database, the first error measure; and
determining a quality of the second model by accessing the stored first error measure for the first decision tree and determining a third error measure for the third decision tree.

Example 6. The method of any one of claims 1 to 5, further comprising:
determining a quality difference between a first model comprising the first decision tree and the second decision tree and a second model comprising the first decision tree and the third decision tree; and
based on the quality difference and a predetermined threshold, removing a second feature from the available set of features.

Example 7. The method of any one of examples 1 to 6, further comprising:
determining a first quality for the first decision tree based on a validation dataset;
determining a second quality for the first decision tree in conjunction with the second decision tree based on the validation dataset;
storing, in the database, third data associating the first quality with the first decision tree; and
storing, in the database, fourth data associating the second quality with the second decision tree.

Example 8. A system comprising:
a memory that stores instructions; and
one or more processors configured by the instructions to perform operations comprising:
generating a first decision tree for partitioning a feature space, the first decision tree using a first set of features, the first set of features being a first subset of an available set of features;
generating a second decision tree that refines the first decision tree to improve the partitioning of the feature space, the second decision tree using zero or more features of the first set of features and a second set of features not included in the first set of features, the second set of features being a second subset of the available set of features;
storing, in a database, first data that associates the first decision tree with the first set of features;
storing, in the database, second data that associates the second decision tree with the second set of features;
removing a feature of the second set of features from the available set of features; and
based on the second data associating the second decision tree with the second set of features comprising the removed feature, generating a third decision tree that refines the first decision tree to improve the partitioning of the feature space, the third decision tree not using the removed feature.

Example 9. The system of example 8, wherein the operations further comprise:
generating a fourth decision tree that refines the first decision tree and the second decision tree to improve the partitioning of the feature space, the fourth decision tree using zero or more features of the first set of features, zero or more features of the second set of features, and a third set of features not included in the first set of features or the second set of features, the third set of features being a third subset of the available set of features;
storing, in the database, third data that associates the fourth decision tree with the third set of features; and
based on the third data associating the fourth decision tree with the third set of features not comprising the removed feature, determining, using the second data, that the removed feature is in the second set of features.

Example 10. The system of example 8 or example 9, wherein the operations further comprise:
determining a quality difference between a first model comprising the first decision tree and the second decision tree and a second model comprising the first decision tree and the third decision tree; and
based on the quality difference and a predetermined threshold, using the first model to partition the feature space.

Example 11. The system of example 10, wherein the operations further comprise:
determining a first quality for the first model based on a validation dataset;
determining a second quality for the second model based on the validation dataset; and wherein
the determining of the quality difference is based on the first quality and the second quality.

Example 12. The system of example 10 or example 11, wherein the determining of the quality difference between the first model and the second model comprises:
determining a quality of the first model by determining a first error measure for the first decision tree and a second error measure for the second decision tree;
storing, in the database, the first error measure; and
determining a quality of the second model by accessing the stored first error measure for the first decision tree and determining a third error measure for the third decision tree.

Example 13. The system of any one of examples 8 to 12, wherein the operations further comprise:
determining a quality difference between a first model comprising the first decision tree and the second decision tree and a second model comprising the first decision tree and the third decision tree; and
based on the quality difference and a predetermined threshold, removing a second feature from the available set of features.

Example 14. The system of any one of examples 8 to 13, wherein the operations further comprise:
determining a first quality for the first decision tree based on a validation dataset;
determining a second quality for the first decision tree in conjunction with the second decision tree based on the validation dataset;
storing, in the database, third data associating the first quality with the first decision tree; and
storing, in the database, fourth data associating the second quality with the second decision tree.

Example 15. A non-transitory machine-readable medium that stores instructions that, when executed by one or more processors, cause the one or more processors to perform operations comprising:

generating a first decision tree for partitioning a feature space, the first decision tree using a first set of features, the first set of features being a first subset of an available set of features;
generating a second decision tree that refines the first decision tree to improve the partitioning of the feature space, the second decision tree using zero or more features of the first set of features and a second set of features not included in the first set of features, the second set of features being a second subset of the available set of features;
storing, in a database, first data that associates the first decision tree with the first set of features;
storing, in the database, second data that associates the second decision tree with the second set of features;
removing a feature of the second set of features from the available set of features; and
based on the second data associating the second decision tree with the second set of features comprising the removed feature, generating a third decision tree that refines the first decision tree to improve the partitioning of the feature space, the third decision tree not using the removed feature.

Example 16. The non-transitory machine-readable medium of example 15, wherein the operations further comprise:
generating a fourth decision tree that refines the first decision tree and the second decision tree to improve the partitioning of the feature space, the fourth decision tree using zero or more features of the first set of features, zero or more features of the second set of features, and a third set of features not included in the first set of features or the second set of features, the third set of features being a third subset of the available set of features;
storing, in the database, third data that associates the fourth decision tree with the third set of features; and
based on the third data associating the fourth decision tree with the third set of features not comprising the removed feature, determining, using the second data, that the removed feature is in the second set of features.

Example 17. The non-transitory machine-readable medium of example 15 or example 16, wherein the operations further comprise:
determining a quality difference between a first model comprising the first decision tree and the second decision tree and a second model comprising the first decision tree and the third decision tree; and
based on the quality difference and a predetermined threshold, using the first model to partition the feature space.

Example 18. The non-transitory machine-readable medium of example 17, wherein the operations further comprise:
determining a first quality for the first model based on a validation dataset;
determining a second quality for the second model based on the validation dataset; and wherein
the determining of the quality difference is based on the first quality and the second quality.

Example 19. The non-transitory machine-readable medium of example 17 or example 18, wherein the operations further comprise:
determining a quality difference between a first model comprising the first decision tree and the second decision tree and a second model comprising the first decision tree and the third decision tree; and
based on the quality difference and a predetermined threshold, removing a second feature from the available set of features.

Example 20. The non-transitory machine-readable medium of any one of examples 15 to 19, wherein the operations further comprise:
determining a first quality for the first decision tree based on a validation dataset;
determining a second quality for the first decision tree in conjunction with the second decision tree based on the validation dataset;
storing, in the database, third data associating the first quality with the first decision tree; and
storing, in the database, fourth data associating the second quality with the second decision tree.

Figure 11:
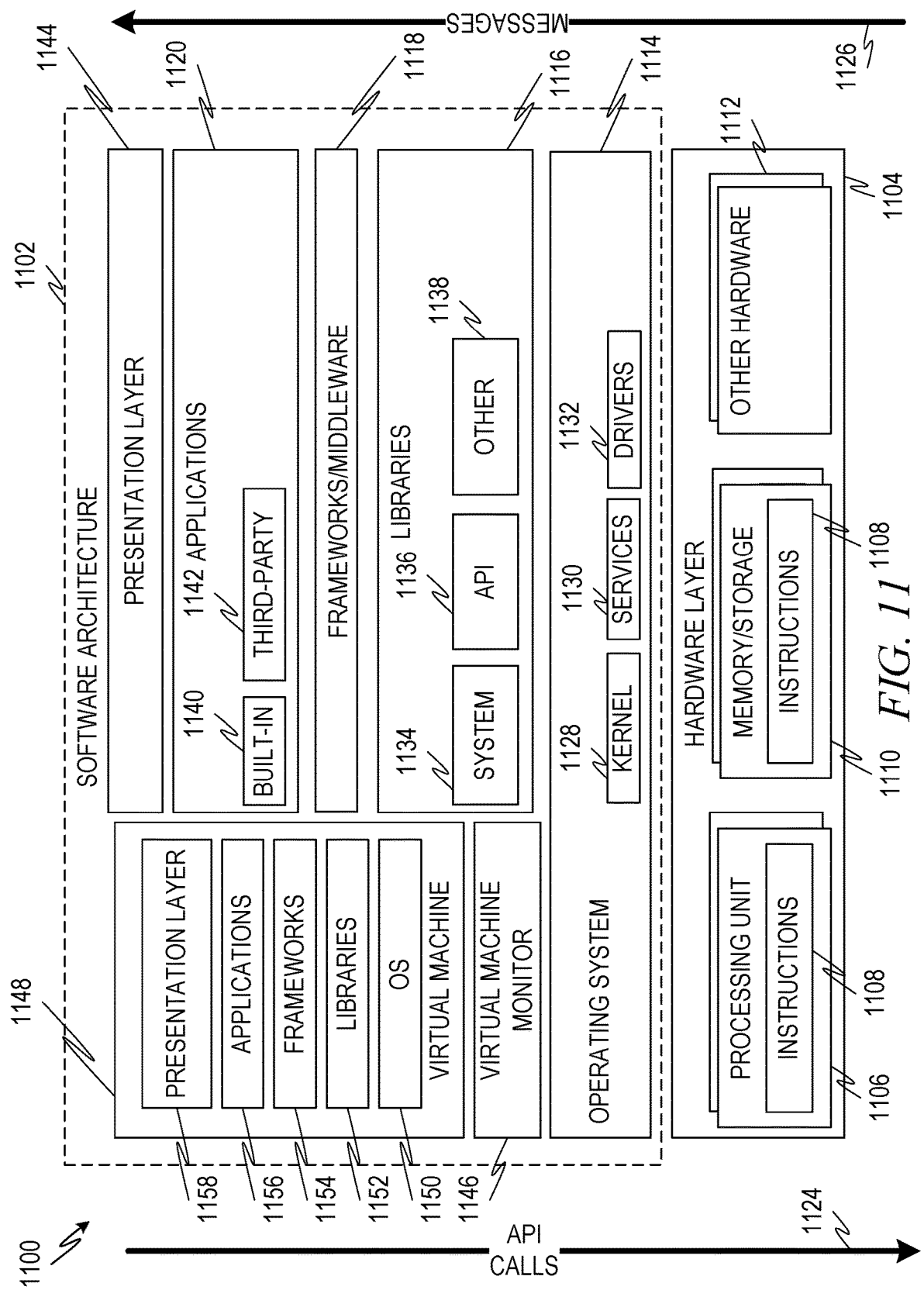
FIG. 11 is a block diagram showing one example of a software architecture for a computing device.

FIG. 11 is a block diagram 1100 showing one example of a software architecture 1102 for a computing device. The architecture 1102 may be used in conjunction with various hardware architectures, for example, as described herein. FIG. 11 is merely a non-limiting example of a software architecture and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system of FIG. 11.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of the software architecture 1102.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and presentation layer 1144. Operationally, the applications 1120 and/or other components within the layers may invoke application programming interface (API) calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 may provide a higher-level common infrastructure that may be utilized by the applications 1120 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system libraries 1134, API libraries 1136, and other libraries 1138), frameworks/middleware 1118 to create user interfaces to interact with users of the system. Alternatively, or additionally, in some systems, interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine 1148 such as an operating system 1150, libraries 1152, frameworks/middleware 1154, applications 1156 and/or presentation layer 1158. These layers of software architecture executing within the virtual machine 1148 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and
Machine-Readable Medium

Figure 12:
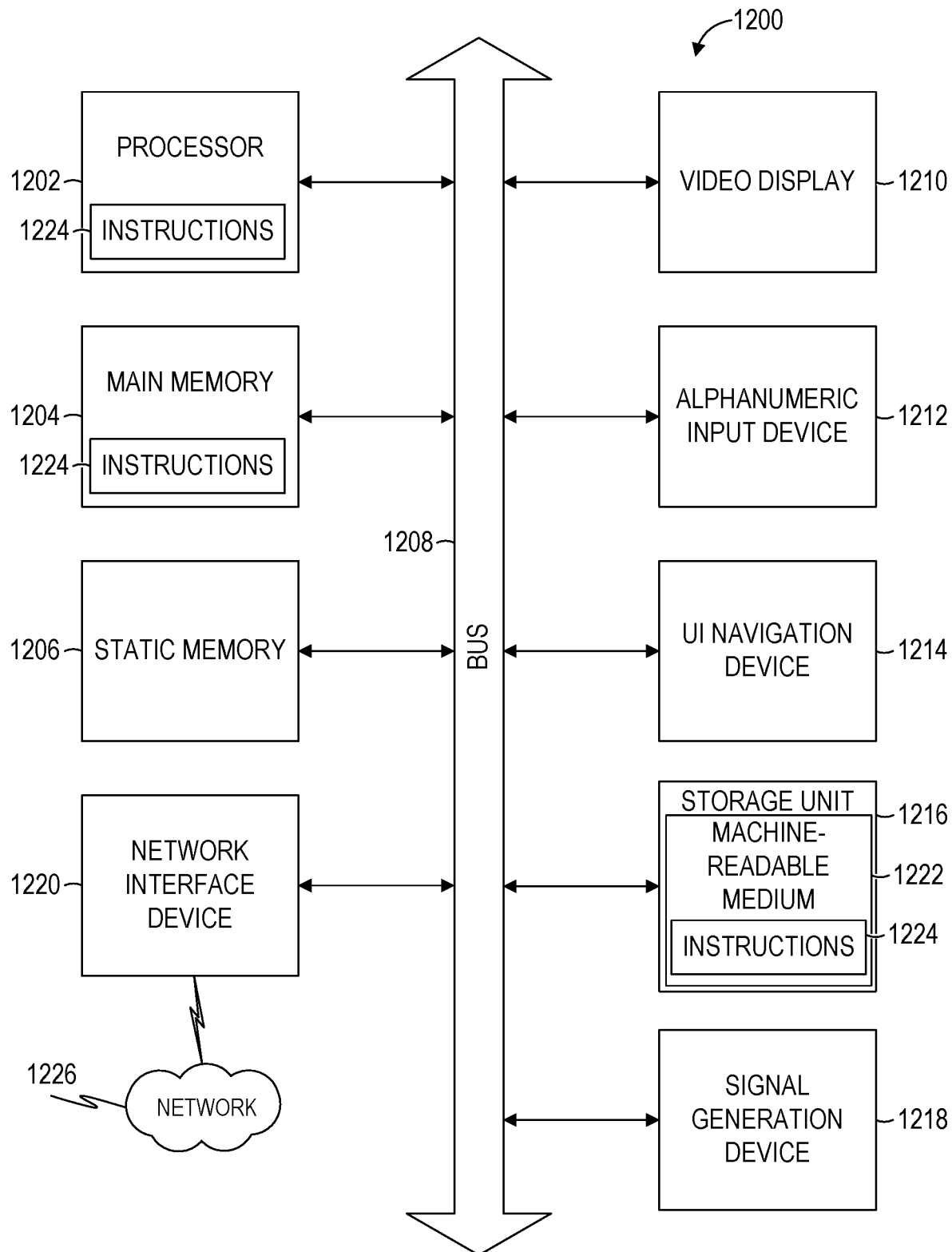
FIG. 12 is a block diagram of a machine in the example form of a computer system within which instructions may be executed for causing the machine to perform any one or more of the methodologies discussed herein.

FIG. 12 is a block diagram of a machine in the example form of a computer system 1200 within which instructions 1224 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation (or cursor control) device 1214 (e.g., a mouse), a storage unit 1216, a signal generation device 1218 (e.g., a speaker), and a network interface device 1220.

Machine-Readable Medium

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media 1222.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1224 may further be transmitted or received over a communications network 1226 using a transmission medium. The instructions 1224 may be transmitted using the network interface device 1220 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

Although specific example embodiments are described herein, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
   generating, by one or more processors, a first decision tree for partitioning a feature space, the first decision tree using a first set of features, the first set of features being a first subset of an available set of features;

generating, by the one or more processors, a second decision tree that refines the first decision tree to improve the partitioning of the feature space, the second decision tree using zero or more features of the first set of features and a second set of features not included in the first set of features, the second set of features being a second subset of the available set of features;

storing, in a database, first data that associates the first decision tree with the first set of features;

storing, in the database, second data that associates the second decision tree with the second set of features;

removing a feature of the second set of features from the available set of features;

based on the second data associating the second decision tree with the second set of features comprising the removed feature, generating a third decision tree that refines the first decision tree to improve the partitioning of the feature space, the third decision tree not using the removed feature;

generating, by the one or more processors, a fourth decision tree that refines the first decision tree and the second decision tree to improve the partitioning of the feature space, the fourth decision tree using zero or more features of the first set of features, zero or more features of the second set of features, and a third set of features not included in the first set of features or the second set of features, the third set of features being a third subset of the available set of features;

storing, in the database, third data that associates the fourth decision tree with the third set of features; and based on the third data associating the fourth decision tree with the third set of features not comprising the removed feature, determining, using the second data, that the removed feature is in the second set of features.

2. The method of claim 1, further comprising:
determining a quality difference between a first model comprising the first decision tree and the second decision tree and a second model comprising the first decision tree and the third decision tree; and
based on the quality difference and a predetermined threshold, using the first model to partition the feature space.

3. The method of claim 2, further comprising:
determining a first quality for the first model based on a validation dataset; and
determining a second quality for the second model based on the validation dataset;
wherein the determining of the quality difference is based on the first quality and the second quality.

4. The method of claim 2, wherein the determining of the quality difference between the first model and the second model comprises:
determining a quality of the first model by determining a first error measure for the first decision tree and a second error measure for the second decision tree;
storing, in the database, the first error measure; and
determining a quality of the second model by accessing the stored first error measure for the first decision tree and determining a third error measure for the third decision tree.

5. The method of claim 1, further comprising:
determining a quality difference between a first model comprising the first decision tree and the second decision tree and a second model comprising the first decision tree and the third decision tree; and
based on the quality difference and a predetermined threshold, removing a second feature from the available set of features.

6. The method of claim 1, further comprising:
determining a first quality for the first decision tree based on a validation dataset;
determining a second quality for the first decision tree in conjunction with the second decision tree based on the validation dataset;
storing, in the database, third data associating the first quality with the first decision tree; and
storing, in the database, fourth data associating the second quality with the second decision tree.

7. The method of claim 1, wherein the generating of the first decision tree comprises using an objective function.

8. A system comprising:
a memory that stores instructions; and
one or more processors configured by the instructions to perform operations comprising:
generating a first decision tree for partitioning a feature space, the first decision tree using a first set of features, the first set of features being a first subset of an available set of features;
generating a second decision tree that refines the first decision tree to improve the partitioning of the feature space, the second decision tree using zero or more features of the first set of features and a second set of features not included in the first set of features, the second set of features being a second subset of the available set of features;
storing, in a database, first data that associates the first decision tree with the first set of features;
storing, in the database, second data that associates the second decision tree with the second set of features;
removing a feature of the second set of features from the available set of features;
based on the second data associating the second decision tree with the second set of features comprising the removed feature, generating a third decision tree that refines the first decision tree to improve the partitioning of the feature space, the third decision tree not using the removed feature;
generating a fourth decision tree that refines the first decision tree and the second decision tree to improve the partitioning of the feature space, the fourth decision tree using zero or more features of the first set of features, zero or more features of the second set of features, and a third set of features not included in the first set of features or the second set of features, the third set of features being a third subset of the available set of features;
storing, in the database, third data that associates the fourth decision tree with the third set of features; and
based on the third data associating the fourth decision tree with the third set of features not comprising the removed feature, determining, using the second data, that the removed feature is in the second set of features.

9. The system of claim 8, wherein the operations further comprise:
determining a quality difference between a first model comprising the first decision tree and the second decision tree and a second model comprising the first decision tree and the third decision tree; and
based on the quality difference and a predetermined threshold, using the first model to partition the feature space.

10. The system of claim 9, wherein the operations further comprise:
    determining a first quality for the first model based on a validation dataset; and
    determining a second quality for the second model based on the validation dataset;
    wherein the determining of the quality difference is based on the first quality and the second quality.

11. The system of claim 9, wherein the determining of the quality difference between the first model and the second model comprises:
    determining a quality of the first model by determining a first error measure for the first decision tree and a second error measure for the second decision tree;
    storing, in the database, the first error measure; and
    determining a quality of the second model by accessing the stored first error measure for the first decision tree and determining a third error measure for the third decision tree.

12. The system of claim 8, wherein the operations further comprise:
    determining a quality difference between a first model comprising the first decision tree and the second decision tree and a second model comprising the first decision tree and the third decision tree; and
    based on the quality difference and a predetermined threshold, removing a second feature from the available set of features.

13. The system of claim 8, wherein the operations further comprise:
    determining a first quality for the first decision tree based on a validation dataset;
    determining a second quality for the first decision tree in conjunction with the second decision tree based on the validation dataset;
    storing, in the database, third data associating the first quality with the first decision tree; and
    storing, in the database, fourth data associating the second quality with the second decision tree.

14. The system of claim 8, wherein the generating of the first decision tree comprises using an objective function.

15. A non-transitory machine-readable medium that stores instructions that, when executed by one or more processors, cause the one or more processors to perform operations comprising:
    generating a first decision tree for partitioning a feature space, the first decision tree using a first set of features, the first set of features being a first subset of an available set of features;
    generating a second decision tree that refines the first decision tree to improve the partitioning of the feature space, the second decision tree using zero or more features of the first set of features and a second set of features not included in the first set of features, the second set of features being a second subset of the available set of features;
    storing, in a database, first data that associates the first decision tree with the first set of features;
    storing, in the database, second data that associates the second decision tree with the second set of features;
    removing a feature of the second set of features from the available set of features;
    based on the second data associating the second decision tree with the second set of features comprising the removed feature, generating a third decision tree that refines the first decision tree to improve the partitioning of the feature space, the third decision tree not using the removed feature;
    generating a fourth decision tree that refines the first decision tree and the second decision tree to improve the partitioning of the feature space, the fourth decision tree using zero or more features of the first set of features, zero or more features of the second set of features, and a third set of features not included in the first set of features or the second set of features, the third set of features being a third subset of the available set of features;
    storing, in the database, third data that associates the fourth decision tree with the third set of features; and
    based on the third data associating the fourth decision tree with the third set of features not comprising the removed feature, determining, using the second data, that the removed feature is in the second set of features.

16. The non-transitory machine-readable medium of claim 15, wherein the operations further comprise:
    determining a quality difference between a first model comprising the first decision tree and the second decision tree and a second model comprising the first decision tree and the third decision tree; and
    based on the quality difference and a predetermined threshold, using the first model to partition the feature space.

17. The non-transitory machine-readable medium of claim 16, wherein the operations further comprise:
    determining a first quality for the first model based on a validation dataset; and
    determining a second quality for the second model based on the validation dataset;
    wherein the determining of the quality difference is based on the first quality and the second quality.

18. The non-transitory machine-readable medium of claim 16, wherein the determining of the quality difference between the first model and the second model comprises:
    determining a quality of the first model by determining a first error measure for the first decision tree and a second error measure for the second decision tree;
    storing, in the database, the first error measure; and
    determining a quality of the second model by accessing the stored first error measure for the first decision tree and determining a third error measure for the third decision tree.

19. The non-transitory machine-readable medium of claim 15, wherein the operations further comprise:
    determining a quality difference between a first model comprising the first decision tree and the second decision tree and a second model comprising the first decision tree and the third decision tree; and
    based on the quality difference and a predetermined threshold, removing a second feature from the available set of features.

20. The non-transitory machine-readable medium of claim 15, wherein the operations further comprise:
    determining a first quality for the first decision tree based on a validation dataset;
    determining a second quality for the first decision tree in conjunction with the second decision tree based on the validation dataset;
    storing, in the database, third data associating the first quality with the first decision tree; and storing, in the database, fourth data associating the second quality with the second decision tree.

\* \* \* \* \*